United States Patent
Lelkes et al.

(10) Patent No.: US 7,030,583 B2
(45) Date of Patent: Apr. 18, 2006

(54) METHOD FOR THE COMMUTATION OF BRUSHLESS DIRECT CURRENT MOTOR

(75) Inventors: András Lelkes, Bad Dürrheim (DE); Nikolay Berbatov, Augsburg (DE)

(73) Assignee: Mineba Co., Ltd, Nagano-Ken (JP)

( * ) Notice: Subject to any disclaimer, the term of this patent is extended or adjusted under 35 U.S.C. 154(b) by 0 days.

(21) Appl. No.: 10/948,838

(22) Filed: Sep. 23, 2004

(65) Prior Publication Data
US 2005/0077854 A1    Apr. 14, 2005

(30) Foreign Application Priority Data
Oct. 8, 2003   (DE) ................. 103 46 711

(51) Int. Cl.
*H02P 7/50* (2006.01)
(52) U.S. Cl. ............... 318/439; 318/434; 318/254
(58) Field of Classification Search ............ 318/254, 318/439, 751, 718, 599, 603, 434; 388/800, 388/803
See application file for complete search history.

(56) References Cited

U.S. PATENT DOCUMENTS

| | | | | |
|---|---|---|---|---|
| RE26,622 E | * | 7/1969 | Neumann et al. | 318/718 |
| 4,481,440 A | * | 11/1984 | Muller | 310/268 |
| 4,651,241 A | * | 3/1987 | von der Heide et al. | 360/73.14 |
| 4,769,581 A | * | 9/1988 | Rilly | 318/254 |
| 5,003,455 A | * | 3/1991 | Miller | 363/87 |
| 6,172,498 B1 | * | 1/2001 | Schmidt et al. | 324/207.12 |
| 6,441,572 B1 | * | 8/2002 | Batzel | 318/254 |
| 6,847,186 B1 | * | 1/2005 | Kerlin | 318/751 |
| 2001/0030517 A1 | * | 10/2001 | Batzel | 318/254 |
| 2002/0014870 A1 | * | 2/2002 | Krotsch et al. | 318/254 |
| 2005/0135794 A1 | * | 6/2005 | Vijayan et al. | 388/800 |
| 2005/0141887 A1 | * | 6/2005 | Lelkes | 388/813 |

FOREIGN PATENT DOCUMENTS

JP         2005117895 A   *  4/2005

* cited by examiner

*Primary Examiner*—Paul Ip
(74) *Attorney, Agent, or Firm*—Norris, McLaughlin & Marcus P.A.; Christa Hildebrand

(57) ABSTRACT

A method for the commutation of a brushless direct current motor having at least one motor winding in which the position of the rotor with respect to the stator is determined, a commutation signal is generated from the position, and the motor winding is energized by a preset commutation angle as a function of the commutation signal. Depending on the construction and energization of the motor, either (i) the polarity of the winding current is registered when a commutation signal appears and the commutation angle is changed as a function of the recorded polarity of the winding current in such a way that the winding current is essentially zero or has a zero point when a commutation signal appears, or (ii) the absolute value of the winding currents is measured and the commutation angle is changed as a function of the absolute value of the winding currents in such a way that the total excitation of the momentary phase calculated from the winding currents is essentially zero when a commutation signal appears.

9 Claims, 3 Drawing Sheets

METHOD FOR THE COMMUTATION OF BRUSHLESS DIRECT CURRENT MOTOR

BACKGROUND OF THE INVENTION

1) Field of the Invention

The invention relates to a method for the commutation of a brushless direct current motor according to the preamble of the independent patent claims.

2) Description of the Related Art

In a brushless DC motor, the motor current is commutated in specific positions of the rotor by electronic switching elements such as transistors. In a single-strand motor, this occurs two times per electric rotation, the voltage applied to the single winding changing poles alternately. In a three-strand motor, commutation occurs every 120° (electric). To ensure that this commutation process takes place at the correct point in time, the momentary position of the motor has to be known.

The usual method of registering the position of the motor is based on the use of Hall sensors. These components are generally arranged in the neutral zone(s) of the armature circumference and measure the magnetic field generated by the permanent magnet rotor. Neutral zones are any points on the armature circumference in which the normal components of induction are zero, in other words, the middle of the stator slot. When the rotor reaches a neutral zone, which also corresponds to the mechanical commutation position, the Hall sensor generates a commutation signal.

Since the motor winding has relatively high inductance, the motor current does not reach its maximum immediately after being switched on but rather lags behind the applied motor voltage, that is, it is delayed by a certain period of time. In order to compensate for this delay, pre-commutation is carried out. This means that the commutation process is started before the rotor has reached the actual commutation position.

There are essentially two ways in which pre-commutation can be realized. One way is for the Hall sensor not to be placed in the neutral zone but rather in a position slightly before the neutral zone in the direction of rotation of the rotor. This results in the Hall sensor generating a commutation signal before the rotor reaches its actual commutation position. This solution is suitable for motors which only operate in one rotational direction, such as motors to drive fans. The disadvantage of this method is that here the magnetic field generated by the stator current can influence the measurement signal of the Hall sensor which can lead to start-up difficulties for the motor, among other problems.

Another method of pre-commutation makes use of the fact that motors operating under a load, particularly in fan applications, often have a high moment of inertia. Because of this, the operating speed changes relatively slowly when the operating conditions change. This inertia is exploited during commutation in that the time between two changes in polarity in the Hall signal, that is the time between two successive commutation signals, is measured. If we assume that the time measured between the next two changes in polarity remains constant, the time of pre-commutation can be calculated from the measured time and measured by means of a timer. This timer can either take the form of a hardware component, e.g. the counter/timer unit of a microcontroller, or be realized in software form. The advantage of this method is that the Hall sensor can be placed in the neutral zone where, due to reasons of symmetry, the influence of the winding current on the sensor is minimal. The disadvantage is the slight increase in requirements placed on the control electronics.

There are also sensor-less motors which do not have any separate position sensors, that is, the position of the rotor is determined without the use of Hall sensors or generally without using any special position sensors. In such sensor-less motors, the motor windings are used as sensors. Here, the position of the rotor is derived from electrically measurable parameters (motor voltage and/or motor current). This method is particularly advantageous for motors with external commutation electronics since here not only can the sensors and their supports in the motor, if any, be omitted, but also the sensor leads to the external electronics and the related plugs.

Irrespective of how the rotor position is measured and how pre-commutation is realized, the question remains as to how large the angle of pre-commutation need be. Changes in this angle can influence not only the torque-speed characteristics of the motor but also its efficiency. If the commutation angle is realized by means of displacing the Hall sensors, the pre-commutation angle can only be optimized for a specific operating point, since the angle itself is established by the mechanical angular position of the Hall sensors. If, however, pre-commutation is realized in the form of software, the commutation angle can be adjusted to the required operating point.

SUMMARY OF THE INVENTION

It is the object of the invention to provide a method for the communication of a brushless DC motor that enables the commutation angle to be automatically optimized by the motor control. It should be possible to optimize the commutation angle at low cost and with little extra technical effort.

This object has been achieved in accordance with the invention. Accordingly, a method for the commutation of a brushless DC motor is provided, having at least one motor winding in which the position of the rotor with respect to the stator is determined and a commutation signal is generated from this, and the motor winding is energized by a preset commutation angle as a function of the commutation signal. When a commutation signal appears, the polarity of the winding current is registered, the commutation angle is changed as a function of the recorded polarity of the winding current in such a way that the winding current (I) is essentially zero or has a zero point when a commutation signal appears. Further, a method for the commutation of a brushless DC motor is provided, having at least two motor windings in which the position of the rotor with respect to the stator is determined and a commutation signal is generated from this, and the motor windings are energized by a preset commutation angle as a function of the commutation signal. When a commutation signal appears, the absolute value of the winding current is measured, the commutation angle is changed as a function of the recorded winding currents in such a way that the total excitation of the momentary phase calculated from the winding currents is essentially zero when a commutation signal appears.

The optimal commutation angle depends on the rotational speed and load. The invention discloses a simple solution demonstrating how the commutation electronics of the motor control can determine the optimal commutation angle as a function of the operating point. It has been recognized that the optimal flow of current in the motor winding is achieved when the timing of the zero point in the winding current coincides with the time the commutation signal appears, or when the total excitation of the momentary phase calculated from the winding currents is essentially zero at the time of the commutation signal. The expression "essentially zero" means a sufficiently low value of the winding or excitation currents which does not deviate from zero by more than a previously defined absolute value.

In a first embodiment of the invention, which is particularly suitable for motors with bipolar energization, provision is made for the winding current to be analyzed. The timing of the zero point in the winding current is compared to the time of the commutation signal.

If the time of the zero point in the winding current comes before the time of the commutation signal, the commutation angle is too large. The motor control has to thus reduce this angle.

If the time of the zero point comes after the time of the commutation signal, the commutation angle is too small. The motor control has to thus increase this angle. Using this method, the control can automatically find the optimal commutation angle in which the time of the zero point in the winding current and the time of the commutation signal coincide with each other.

In a second embodiment of the invention, which is particularly suitable for multi-strand motors with unipolar energization, it is provided that the absolute value of the winding currents is measured when a commutation signal appears and the commutation angle is changed in such a way that the total excitation of the momentary, that is the momentarily energized, phase calculated from the winding currents is essentially zero when a commutation signal appears.

One advantage of the invention is that, apart from the commutation signal, a Hall signal, for example, in the case of a motor with sensors, the commutation electronics in the motor control need only additionally analyze the polarity and/or the absolute value of the winding current to determine the optimal commutation angle.

As a result, the cost of additional sensor technology remains low. The control can be advantageously realized in the form of software in a microcontroller of the commutation electronics.

BRIEF DESCRIPTION OF THE DRAWINGS

The invention is described in more detail below on the basis of embodiments with reference to the drawings.

DETAILED DESCRIPTION OF THE INVENTION

Figure 1:
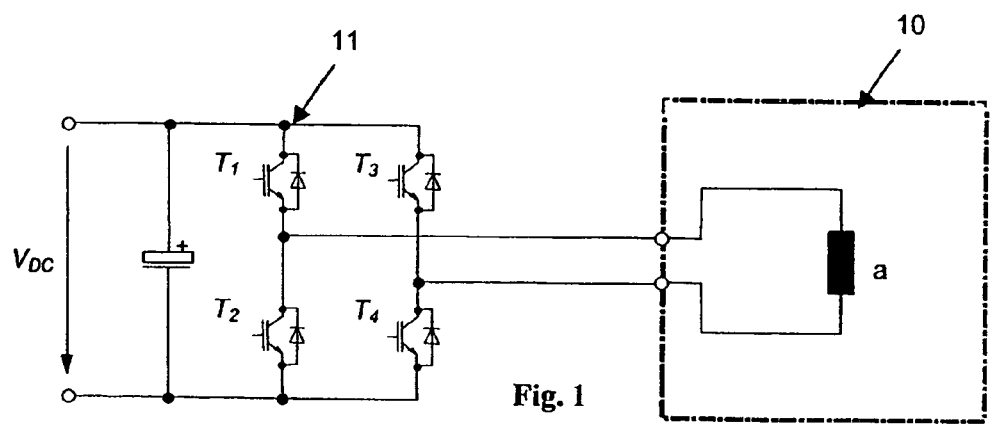
FIG. 1 shows a simplified block diagram of a single-strand, single-phase, bipolar DC motor.

FIG. 1 shows a simplified block diagram of a single-strand, brushless DC motor. The motor comprises the actual motor 10 and the associated motor control 11 having commutation electronics which can be either integrated into the motor or be provided externally. The single winding a of the stator has bipolar energization for an electrical angle of 180° each, that is after 180° the polarity of the supply voltage $V_{DC}$ is switched over by the transistors $T_1$ to $T_4$ of the control 11. These kinds of single-strand, brushless DC motors are used, for example, to drive fans.

It is assumed that a position sensor, taking the form of a Hall sensor for example, is arranged in the middle of the stator slot of this motor, in other words in the neutral zone. The Hall sensor delivers, for example, a rectangular output signal that is fed as a commutation signal to an input of a microcontroller of the motor control 11. If a flank is produced in the commutation signal, an interrupt, for example, is triggered in the microcontroller. The program sequence for the commutation is usually started with this interrupt. According to the invention, the polarity of the bipolar winding current is registered at this point of time. If the winding current of the positive half wave is positive (FIG. 2) when the commutation signal changes, the motor control reduces the commutation angle. If, on the other hand, the winding current of the positive half wave is negative (FIG. 4) when the commutation signal changes, the commutation angle has to be increased. When the negative half waves are analyzed, the opposite polarities in the winding current apply accordingly, that is if the winding current is negative, the commutation angle is reduced and if the winding current is positive it is increased.

Following this calculation, the motor control can calculate the time of the next commutation and start a timer that determines the time of the actual commutation as a function of the commutation signal.

Figure 2:
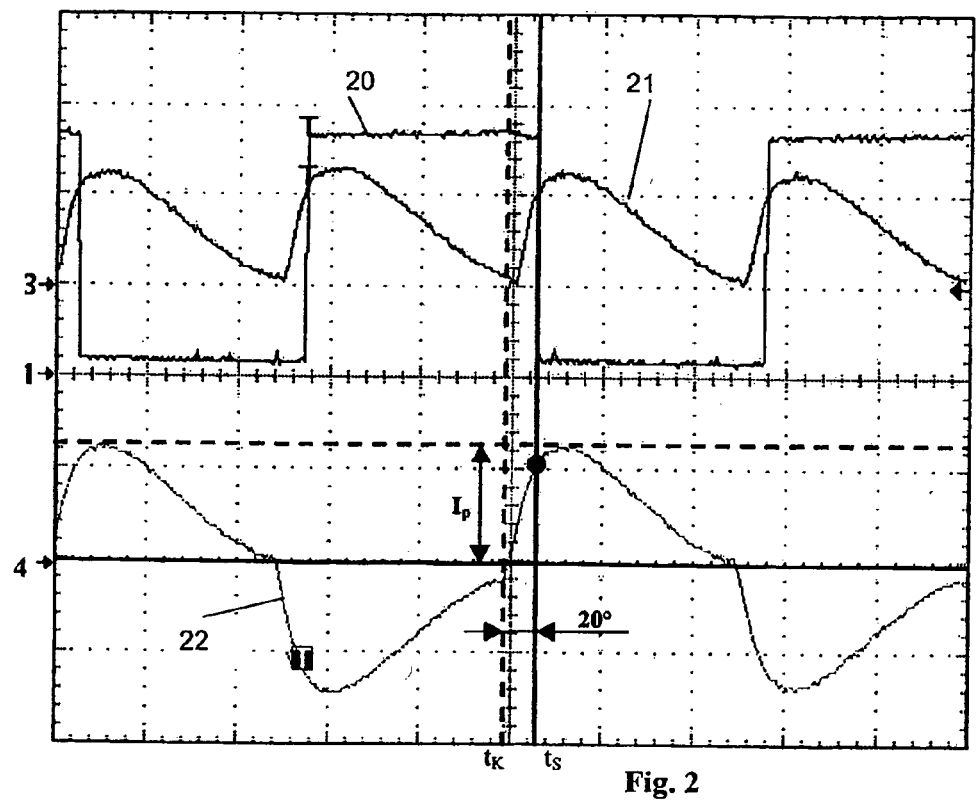
FIG. 2 shows the output signal of the Hall sensor, the motor current and the winding current of a motor according to FIG. 1 at a specific rotational speed and a commutation angle of 20° (electric).

FIG. 2 shows a diagram of several motor parameters of a single strand, 4-pole outer rotor motor, more specifically a diagram of the commutation signal 20 (top), the motor current 21 (center) and the winding current 22 (bottom) at a specific rotational speed, for example at 1980 min$^{-1}$. In this example, the commutation angle is 20° electric, that is the winding current 22 is switched over at time $t_K$ 20° before the actual commutation time, which is indicated by a flank of the commutation signal $t_s$ of the Hall sensor. The peak current appearing in the winding is indicated by $I_P$.

Figure 3:
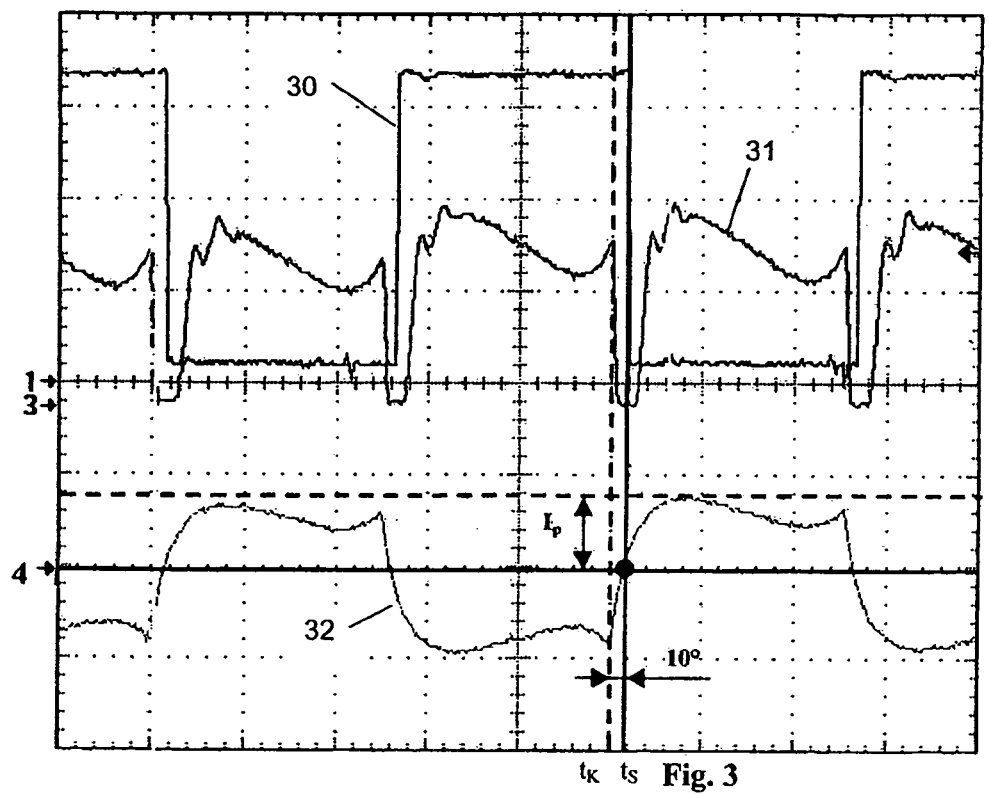
FIG. 3 shows the output signal of the Hall sensor, the motor current and the winding current of a motor according to FIG. 1 at a specific rotational speed and a commutation angle of 10° (electric).

FIG. 3 shows the same signals, the commutation signal 30, motor current 31 and winding current 32 of the same motor with a different commutation angle of 10° electric. Due to the change in the commutation angle, the rotational speed also changes and thus the load on the motor. To compensate for this effect, the motor voltage can be adjusted until the original rotational speed of 1980 min$^{-1}$ is once again achieved. Since a fan propeller places a load on the motor, not only does the motor operate with the same rotational speed as in FIG. 2, but also with the same torque. It can be seen that, due to the different commutation angle, now of 10° electric, the peak current $I_P$ in the winding has been reduced. At the same time, the input power falls. If, however, the commutation angle is reduced further, the peak current increases.

Figure 4:
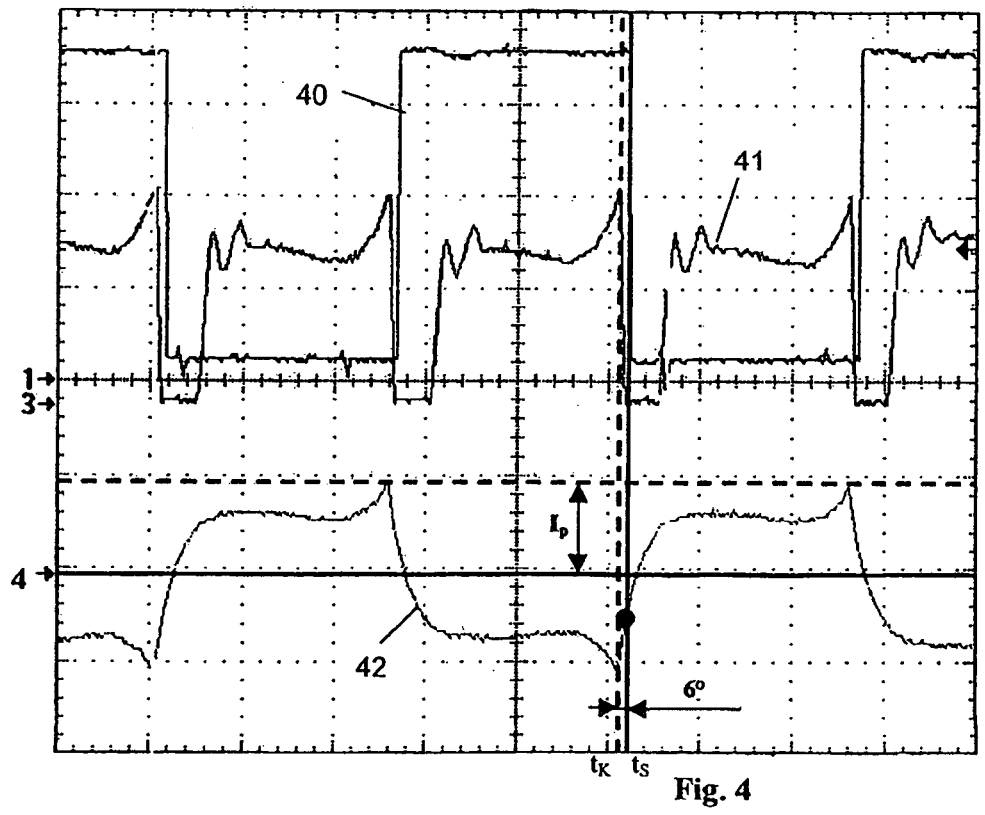
FIG. 4 shows the output signal of the Hall sensor, the motor current and the winding current of a motor according to FIG. 1 at a specific rotational speed and a commutation angle of 6° (electric).

FIG. 4 shows the commutation signal 40, the motor current 41 and the winding current 42 at the same operating point at a commutation angle of 6° electric. Here, the peak current $I_P$, and thus the input power of the motor as well, is greater than the example shown in FIG. 3, although the output power is kept constant. This means that the motor operates with less efficiency. The peak current increases by approx. 20% compared to FIG. 3.

In this example, optimal operation and the optimal operating point are therefore achieved at a commutation angle of 10° electric according to figure FIG. 3.

If the zero point in the winding current 22 occurs before the commutation signal 20, as shown in FIG. 2, the commutation angle, in this case 20° electric, is too large, The motor control should thus reduce this angle. If the zero point in the winding current 42 occurs after the commutation signal 40, according to FIG. 4, the commutation angle, in this case 6° electric, is too small. The motor control should thus increase this angle. Using this method, the motor control can find the optimal commutation angle in which the zero point in the winding current 32 and the change in the commutation signal 30 essentially coincide at the same time, as shown in FIG. 3, at a commutation angle of 10° electric.

The invention is not only limited to the embodiment of a single-strand outer rotor motor with a Hall sensor for fan applications as presented here, but also includes all embodiments having the same function within the meaning of the invention, in particular multi-strand motors, sensor-less motors and both inner and outer rotor motors for various applications.

The invention is particularly suitable for the control of single or multi-strand motors that are operated using a unipolar power supply. This has the added advantage that the currents can be measured, by using shunts, for example, that are located on the same potential (−bar), which makes it easier to realize the switching technology.

For multi-strand motors in accordance with FIGS. 5 to 8, the effective excitation is produced by several winding currents. The following considerations assume that all the windings have the same number of turns. If the numbers of turns differ from each other, the winding currents have to be augmented with appropriate factors corresponding to the winding ratio.

Figure 5:
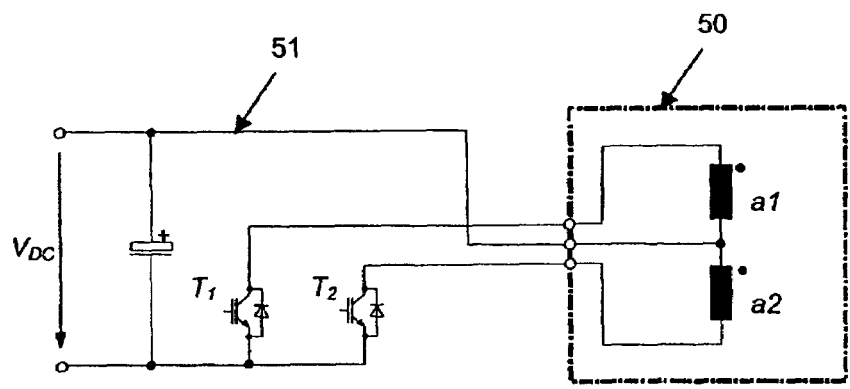
FIG. 5 shows a simplified block diagram of a two-strand, single-phase, unipolar DC motor.

FIG. 5 shows a simplified block diagram of a two-strand, single-phase, unipolar DC motor 50 having motor control 51. This motor 50 contains two windings a1, a2, which generate excitation in opposite directions, which means an equivalent excitation current $I_E$ can be defined:

$$I_E = 1_{a1} - 1_{a2}$$

That is to say, the total excitation corresponds to the excitation of a single-strand motor if it has the same number of turns as the windings a1 and a2 (thus not the sum), and is energized with current $I_E$.

Commutation should accordingly take place in such a way that the commutation signal and the event $I_E=0$ happen at almost the same time. In this motor, the winding currents equal the currents of the power transistors $T_1$ to $T_4$:

$$I_{a1} = I_{T1} \text{ and } 1_{a2} = I_{T2}$$

which means the currents of the transistors can be used accordingly:

$$I_E = I_{T1} - I_{T2}$$

wherein $I_{T1}$ or $I_{T2}$ represent the total current at the corresponding transistor and at the recovery diode in inverse parallel connection, irrespective of whether the recovery diode is integrated into the transistor, as is usual with MOSFETs, or whether it is designed to be separate.

Figure 6:
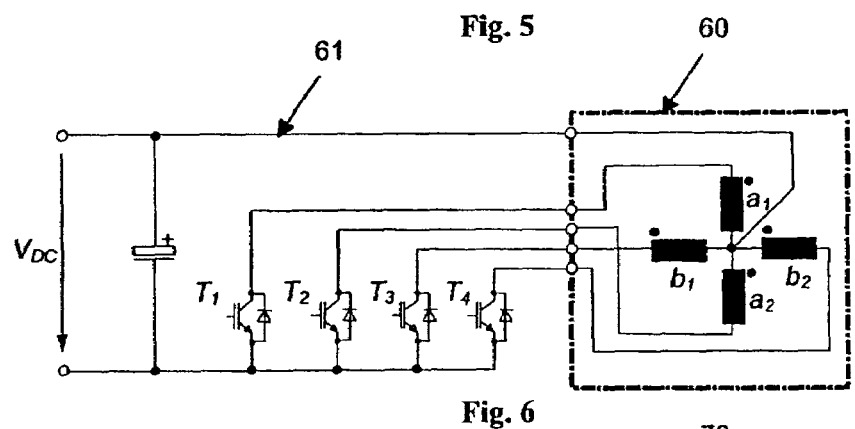
FIG. 6 shows a simplified block diagram of a four-strand, two-phase, unipolar DC motor.

In the four-strand, unipolar motor 60 having motor control 61 according to FIG. 6, the phases a ($a_1$ and $a_2$) and b ($b_1$ and $b_2$) form an angle of 90° electric. This is why the current in phase a does not influence the excitation in phase b and vice versa. The following applies to the excitation currents $I_{Ea}$ or $I_{Eb}$ of phases a or b:

$$I_{Ea} = I_{a1} - I_{a2} = I_{T1} - I_{T2}$$

$$I_{Eb} = I_{b1} - I_{b2} = I_{T3} - I_{T4}$$

Thus in order to optimize the commutation angle, one of the following conditions of the commutation sequence applies, alternatively:

$$I_{Ea} = 0 \text{ or}$$

$$I_{Eb} = 0$$

Accordingly, commutation must take place here according to the invention in such a way that the commutation signal and the event $I_{Ea}=0$ or $I_{Eb}=0$ happen at 30 approximately the same time.

Figure 7:
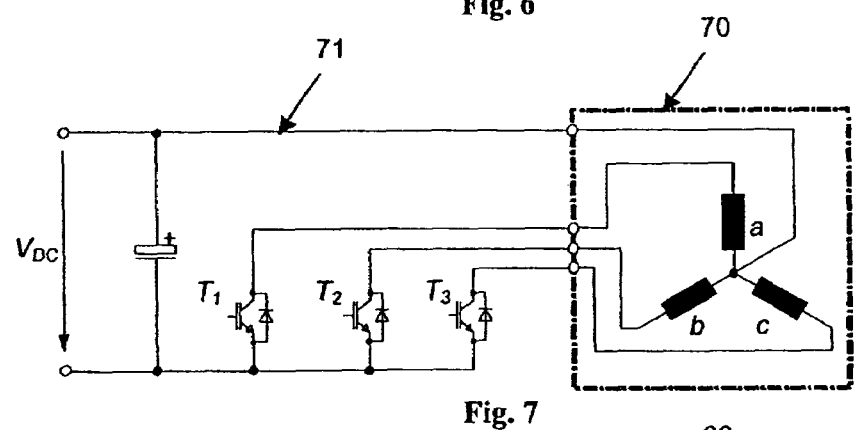
FIG. 7 shows a simplified block diagram of a three-strand, three-phase, unipolar DC motor.

FIG. 7 shows a simplified circuit diagram of a three-strand, unipolar motor 70 having a corresponding motor control 71. There are three phases a, b and c that form an angle of 120° electric. Since the value is cos 120°=−0.5, the phase currents in phases b and c, for example, act on the excitation in phase a with the factor −0.5. Thus resulting in:

$$I_{Ea} = I_a - 0.5(I_b + I_c)$$

The same of course also applies to the other phases:

$$I_{Eb} = I_b - 0.5(1_c + I_a)$$

$$I_{Ec} = I_C - 0.5(1_a + I_b)$$

Accordingly, the prevailing conditions for determining an optimal commutation angle are that the total excitation of the momentary phase must always be essentially zero when a commutation signal appears:

$$1_{Ea} = 0 \text{ or } I_{Eb} = 0 \text{ or } I_{Ec} = 0.$$

For example, if during commutation the motor current is to be switched off in phase a, the condition $I_{Ea}=0$ applies.

Since each phase current flows through an appropriate power switch (=transistor+recovery diode), the current can also be measured at this switch.

For example for phase a:

$$I_{Ea} = I_{T1} - 0.5(I_{T2} + I_{T3})$$

Figure 8:
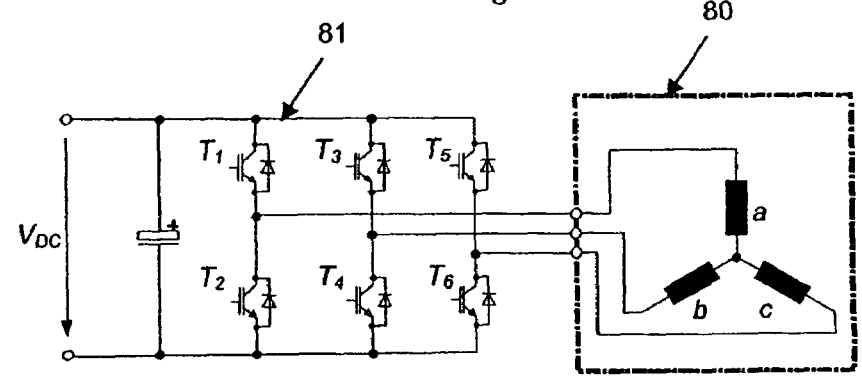
FIG. 8 shows a simplified block diagram of a three-strand, three-phase, bipolar DC motor.

For a three-strand, bipolar motor 80 according to FIG. 8, the equation established in connection with the motor according to FIG. 7 basically applies:

$$I_{Ea} = I_a - 0.5(I_b + I_c)$$

However, since the star point is not implemented here, the following applies in addition:

$$I_a + I_b + I_c = 0$$

As a result, the following equation can be used for any arbitrary λ values:

$$I_{Ea} = I_{Ea} + 0 = I_{Ea} + \lambda(I_a + I_b + I_c) = I_a - 0.5(I_b + I_c) + \lambda(I_a + I_b + I_c)$$

For λ=0.5, the result includes the following:

$$I_{Ea} = 1.5 I_a$$

This means that here the condition $1_a=0$ can also be used to establish the commutation angle.

The application of the method according to the invention in the examples shown in FIGS. 1 and 8 requires that the electronics in the motor control recognize the zero point in the phase current. This can be achieved, however, without having to measure the current directly.

In a single-strand bipolar motor according to FIG. 1, for example, the switches $T_1$ and $T_4$ conduct. After commutation, the current is switched over so that the switches $T_3$ and $T_2$ are connected through. When $T_1$ and $T_4$ are switched off, initially the recovery diodes of $T_2$ and $T_3$ switch on. It is only after the current has changed its polarity that the transistors $T_2$ and $T_3$ actually conduct. When the recovery diode conducts, the electric potential of the winding wire is approx. −0.7 V more negative than the potential of the negative intermediate circuit bar. When the transistor conducts, the potential is slightly more positive than the potential of the negative bar due to the voltage drop at the transistor. This means that instead of the winding current, the voltage drop at the switch can be measured, which has its advantages and is also cost saving. The same applies to three-strand bipolar motors according to FIG. 8.

The invention claimed is:

1. A method for the commutation of a brushless DC motor having at least one motor winding, a rotor, and a stator, the method comprising the steps of:
   generating a commutation signal based on the position of the rotor with respect to the stator;
   energizing the at least one motor winding by a preset commutation angle as a function of the commutation signal;
   registering a polarity of a winding current when a commutation signal appears; and
   changing the commutation angle as a function of the polarity of the winding current so that timing of an essentially zero point of the winding current coincides with when a commutation signal appears.

2. The method according to claim 1, wherein the changing step comprises reducing the commutation angle during bipolar energization of the at least one motor winding when the polarity of the winding current is positive in a positive half wave, or when the polarity of the winding current is negative in a negative half wave.

3. The method according to claim 2, wherein the changing step further comprises increasing the commutation angle during bipolar energization of the at least one motor winding when the polarity of the winding current is negative in a positive half wave, or the polarity of the winding current is positive in a negative half wave.

4. The method according to claim 1, wherein the changing step comprises increasing the commutation angle during bipolar energization of the at least one motor winding when the polarity of the winding current is negative in a positive half wave, or the polarity of the winding current is positive in a negative half wave.

5. The method according to claim 1, wherein the polarity of the winding current is determined by measuring a voltage drop at an appropriate power switch.

6. The method according to claim 1, wherein the position of the rotor is registered using at least one position sensor and the commutation signal is generated from the registered position.

7. A method for commutation of a brushless DC motor having at least two motor windings, a rotor, and a stator, the method comprising the steps of:
   generating a commutation signal based on the position of the rotor with respect to the stator;
   energizing the at least two motor windings by a preset commutation angle as a function of the commutation signal;
   determining an absolute value of a winding current in each of the at least two motor windings when a commutation signal appears; and
   changing the commutation angle as a function of the winding currents in such a way that a total excitation of a momentary phase calculated from the winding currents is essentially zero at a time when a commutation signal appears.

8. The method according to claim 7, wherein the absolute value of the winding current is registered by measuring a voltage drop at an appropriate power switch.

9. The method according to claim 7, wherein the position of the rotor is registered using at least one position sensor and the commutation signal is generated from the registered position.

* * * * *